United States Patent [19]
Cannella

[11] Patent Number: 6,030,144
[45] Date of Patent: Feb. 29, 2000

[54] EDGING RESISTANT SYSTEM FOR PAVING BLOCKS

[76] Inventor: Samuel Michael Cannella, 22 Hilldale Rd., Pine Brook, N.J. 07058

[21] Appl. No.: 08/782,167

[22] Filed: Jan. 14, 1997

[51] Int. Cl.[7] .............................. A01G 1/08; E01C 11/22
[52] U.S. Cl. ..................... 404/7; 47/33; 52/102
[58] Field of Search ................. 47/33; 52/102; 404/6, 7, 8

[56] References Cited

U.S. PATENT DOCUMENTS

| | | | |
|---|---|---|---|
| 3,724,128 | 4/1973 | Tabone | 47/33 |
| 4,823,521 | 4/1989 | Kontz, Jr. | 52/102 |
| 4,831,776 | 5/1989 | Fritch | 404/7 |
| 4,863,307 | 9/1989 | Jones | 404/7 |
| 5,073,061 | 12/1991 | Jones | 404/7 |
| 5,375,369 | 12/1994 | Verhoeve | 47/33 |
| 5,377,447 | 1/1995 | Fritch | 404/7 X |
| 5,640,801 | 6/1997 | Rynberk | 47/33 |

OTHER PUBLICATIONS

Pave Tech, Inc. Brochure, "Paver Edge Restraint System for interlocking concrete paver and brck pavements," Pave Tech, Inc., Bloomington, Minnesota, 1992.

*Primary Examiner*—James A. Lisehora
*Attorney, Agent, or Firm*—Lieberman & Nowak, LLP

[57] ABSTRACT

A restraint edging system for a segmented paving surface, including a vertical strip component for surrounding the boundary of the segmented paved surface, and a support member component. The vertical strip component has one or more parallel protruding ribs running the length of the vertical strip component which mate to recesses in the support component. The support component also serves to connect vertical strip portions.

9 Claims, 3 Drawing Sheets

EDGING RESISTANT SYSTEM FOR PAVING BLOCKS

FIELD OF INVENTION

This invention relates generally to an edging restraint system for paving blocks and, more particularly, to an edging system with increased strength, and which provides enhanced ease of assembly and installation.

BACKGROUND OF THE INVENTION

Segmented paving systems such as paving blocks or stones and paving bricks have been used since antiquity. Indeed, prior to the discovery and use of concrete and blacktop, segmented paving systems were essentially the only means to construct highways, sidewalks and the like.

Due to the nature of the segmented paving system, it is, of course, understood that force applied to the top surface of the paved surface will result in the generation of horizontal forces which tend to dislodge the individual paving blocks which form the outer boundary of the paved surface. Thus, the need for an edge restraint system for use with a segmented paving system has been recognized for a substantial period of time, and many possible solutions to this problem have been suggested.

One such solution is presented in U.S. Pat. No. 5,073,061, granted to Stephen Jones on Dec. 17, 1991. The Jones patent describes a paving support apparatus, which includes a substantially vertical strip defining a boundary around paving members, and two horizontal portions attached to, and extending outwardly from the sidewalls of the vertical strip. One horizontal portion extends a predetermined distance under the paving members, and is staked to the underlying soil. The second horizontal portion extends outwardly from the paving members, and is also staked to the underlying soil. The second horizontal portion further utilizes diagonal support members attached to the vertical strip to resist the horizontal forces applied to the vertical strip when force is applied to the upper surface of the paving blocks.

Another possible solution to the edging restraint problem is presented in U.S. Pat. No. 5,240,343, granted to Frederick P. Strobl, Jr., on Aug. 31, 1993. This system includes a vertical side for contacting the paving blocks which is buttressed by gusset members, which, in turn, are supported by a boss member. The boss member provides for driving a stake into the underlying soil in order to hold the vertical side in place. This system is a one-piece injection molded device which is capable of use for restraining curved areas of a paving surface, if certain portions of the restraint system are removed (cut-out) by the user.

Although the prior art has provided several possible solutions to the problem of edge restraint for a segmented paving system, the need still exists to provide a system which is strong, easy to use and inexpensive.

The instant invention satisfies that need.

SUMMARY OF THE INVENTION

In accordance with the invention, there is provided a restraint system for a segmented paved surface, which includes a vertical strip of flexible material for surrounding the boundary of the paved surface. The vertical strip has a smooth inner surface, which tightly abuts an edge of the paved surface and an outer surface.

The outer surface includes one or more horizontally spaced and parallel protruding ribs which extend the length of the vertical strip and are utilized to connect the vertical strip to a support member.

The support member includes one or more horizontally spaced and parallel recesses which mate with the ribs on the vertical strip to connect the vertical strip to the support member. The support member also contains a vertically aligned aperture for receiving a stake which secures the support member to the underlying surface.

The vertical strip is preferably designed in a plurality of strip portions of convenient length, and the support member also functions as a connector between vertical strip portions.

The forgoing and other advantages and features of this invention will be more fully understood from the following description of an illustrative embodiment thereof taken in conjunction with the accompanying drawings.

DETAILED DESCRIPTION OF THE PREFERRED EMBODIMENT

The instant invention is directed to solving the long-standing problem of restraining the edges of a paved surface consisting of a plurality of segmented paving blocks. The appearance of such a paved surface is well-known and will not be shown or described in further detail. However, such surfaces are widely used and can be arranged in a multitude of shapes and patterns.

In accordance with the invention, the restraint system consists of two components, the first component being a vertical strip of flexible material used to surround the boundary of the paved surface. The vertical strip is preferably divided into a plurality of strip portions, with each strip portion being of a length that is convenient to transport to a job site and convenient to handle when installed.

Each strip portion has an upstanding vertical wall, and a horizontal surface formed along an inner wall of the strip portion. The horizontal surface fits under the paved surface of the strip portion, and the vertical wall tightly abuts the outer edge of the paved surface, thereby providing restraint.

The outer wall of the vertical strip portion has formed thereon one or more ribs which protrude outwardly from the outer wall, and extend along the entire length of the strip portion. The ribs have two purposes, one is to provide increased strength to the vertical strip portion, and the second is to provide a means of connecting the outer wall of the vertical strip portion to a support member.

The second component of the inventive restraint system is a support member. The support member is connected to the ribs on the outer wall of the strip portion to support the outer wall, and is also staked to the underlying surface through an aperture in the support member. Advantageously, the support member is also used to join the vertical strip portions in order to provide a continuous run which forms the complete restraint system.

Figure 1A:
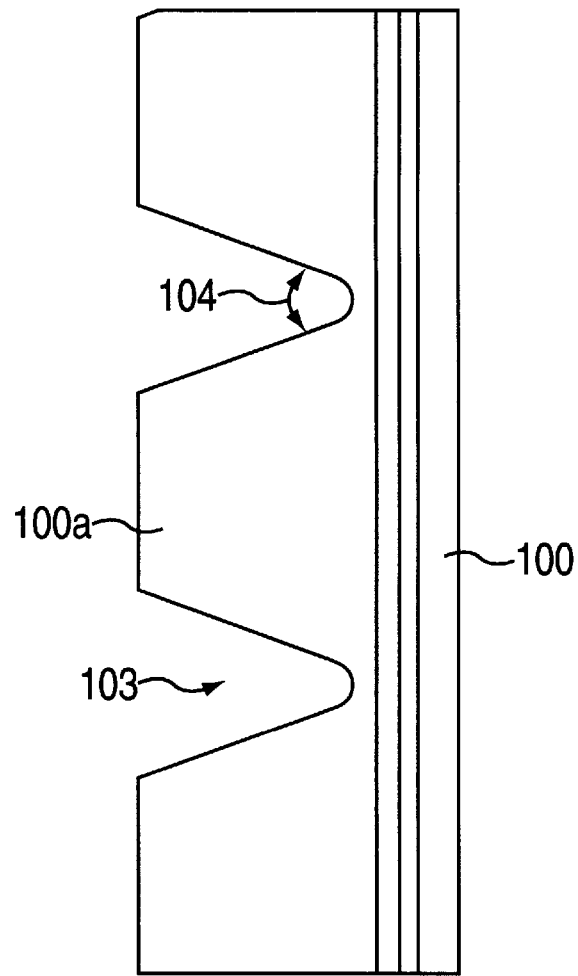
FIGS. 1A and 1B illustrate a top and side view of a vertical strip component of the instant invention.
Figure 1B:
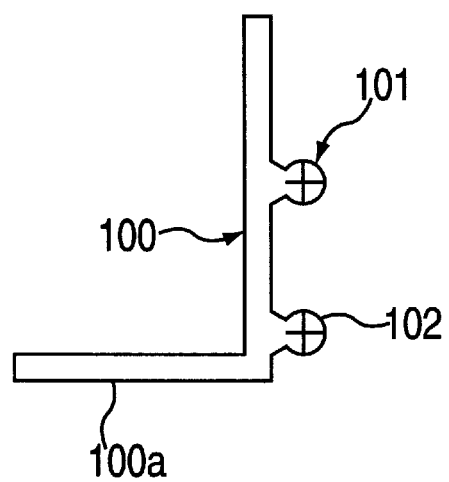

Referring now to FIG. 1, there is shown a top view of the vertical strip portion in FIG. 1A and a side view in FIG. 1B. The vertical portion is shown at 100, and the horizontal portion is shown at 100A.

It is to be understood that the segmented paving blocks of the paving surface would be placed on surface 100A and tightly abut the inner wall of vertical side 100.

The ribs referred to above are shown at 101 and 102. Although two ribs are shown for this embodiment, it is to be understood that one or more ribs could be used for strengthening vertical wall 100 and for connection to the support member as described below. Ribs run the entire length of vertical wall 100 on the wall's surface away from the paved surface. Although it is preferable that ribs 101 and 102 run the entire length of wall 100, it is to be understood that the ribs could, in some instances, be of a length less than the length of wall 100.

The horizontal surface, 100A, has included therein a series of openings 103 and 104. The angle shown at 104 can vary in amount, but preferably is approximately 40°. The purpose of openings 103 and 104 is to facilitate bending of this component of the restraint system, when the restraint system must bend or curve to surround an irregular shaped paved surface.

It is to be understood that the length of component 100 can be of any convenient length subject to providing ease of transportation and installation.

Figure 2A:
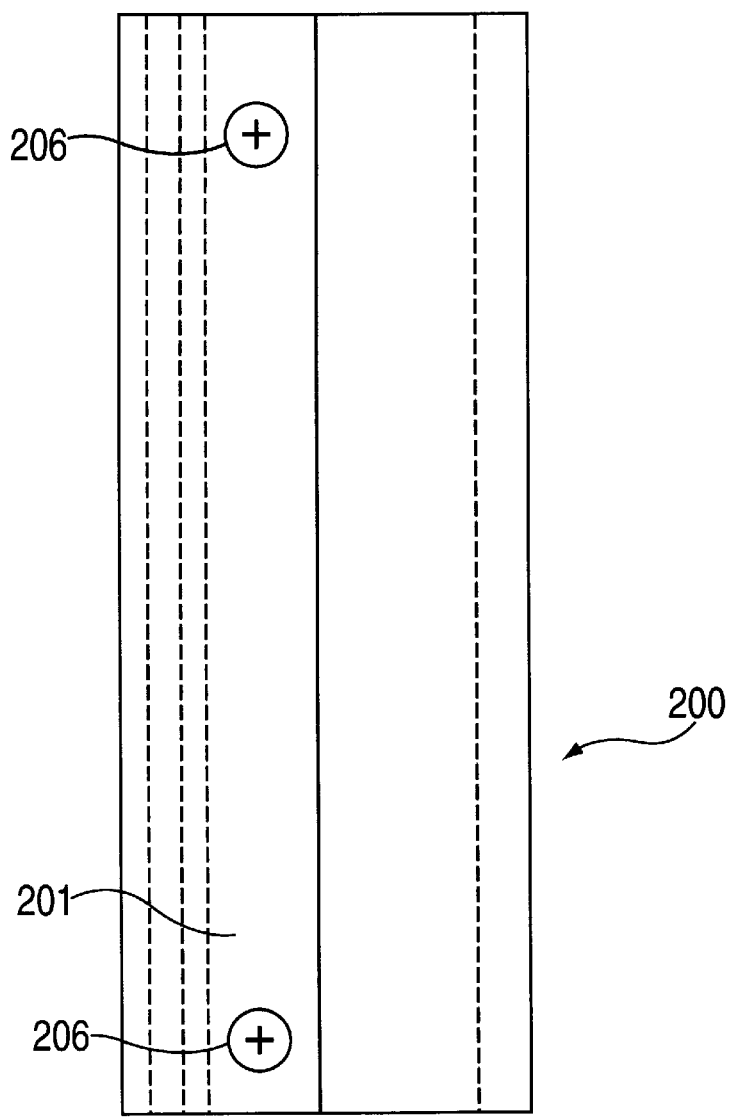
FIGS. 2A and 2B illustrate a top and side view of a support member component of the instant invention.
Figure 2B:
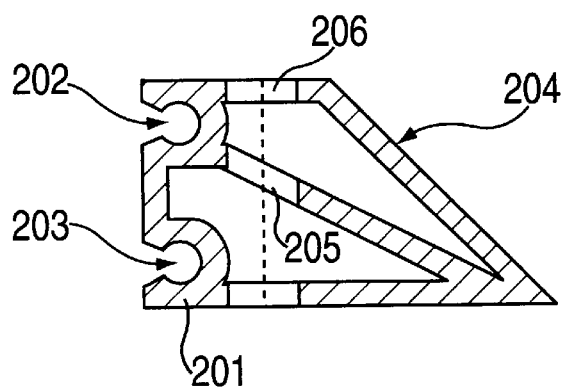

Referring now to FIGS. 2A (top view) and 2B (side view), there is shown the support member 200 which is the second component of the inventive paving restraint system.

Recesses 202 and 203 mate with ribs 101 and 102 to connect the support member component to the vertical component 100. Members 204 and 205 provide structural support to increase the strength of the inventive restraining system. Apertures 206 pass vertically through the support member, and is designed to receive spikes that will secure the support member to the underlying surface 201. Support member 200 can be of any convenient length, but will generally be of a length less than the length of vertical member 100.

Figure 3A:
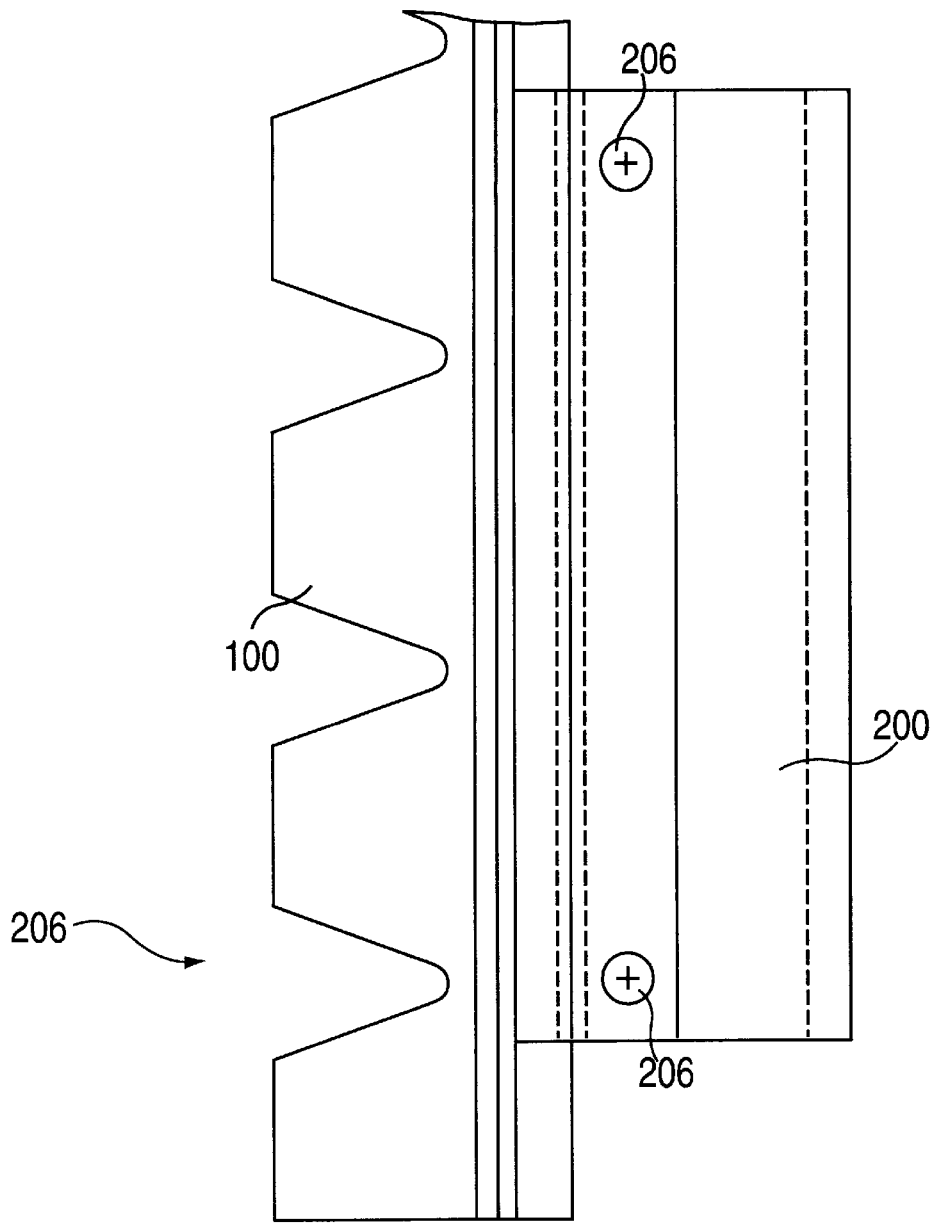
FIGS. 3A and 3B illustrate a top and side view of a vertical strip component and the support member component being joined together.
Figure 3B:
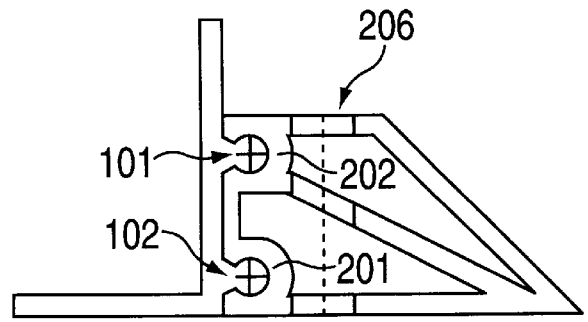

Referring now to FIGS. 3A and 3B, there is shown the inventive restraining system with vertical member 100 mated with support member 200. As indicated, ribs 101 and 102 "snap" into recesses 201 and 202, to provide a strong connection between components 100 and 200. Apertures 206 are used, as stated above, to receive spikes which secures support member 200 to the underlying surface.

As shown, support member 200 is shorter than vertical member 200, and would be placed at predetermined intervals along vertical member 100, depending on the paving surface to be restrained. Support member 200 also is used to connect vertical member portions, wherein the length of the support member would overlap the ends of adjoining vertical member portions.

In order to make components 100 and 200 of the inventive paving restraint system, any suitable method may be employed. However, the simplicity of the invention, and the inherent strength of its design, permits the use of injection molding of a plastic or synthetic resin to provide a strong device which may be used in an efficient manner, both during transport and installation.

The advantages of the instant invention include, but are not limited to:

1. Increased strength due to the rib formation running along the length of the vertical portion.
2. Assembly requires only three (3) parts, vertical portion, support member and a stake.
3. The support member functions both to support the vertical member when staked, and as a connector between the vertical section portions.

Although the present invention has been described in conjunction with the preferred embodiments, it is to be understood that modifications and variations may be resorted to without departing from the spirit and scope of the invention, as those skilled in the art will readily understand. Such modifications and variations are considered to be within the purview and scope of the invention, and the appended claims.

What is claimed is:

1. A restraint system for a segmented paved surface comprising,
    a vertical plate having an inner side for contacting an edge of said paved surface and an outer side,
    a support member which connects to the outer side of said vertical plate,
    said outer side including at least one protrusion extending outwardly from said outer side, said protrusion being substantially perpendicular to said vertical plate, and being substantially cylindrical in shape,
    said support member including at least one recessed portion, said recessed portion being substantially cylindrical for mating with said cylindrical protrusion to provide said connection between said vertical plate, and said support member, said cylindrical protrusion being snapped into said cylindrical recessed portion, and
    an aperture extending vertically through said support member to receive a stake to connect said support member to an underlying surface.

2. A restraint system in accordance with claim 1, wherein said outer side includes at least two cylindrical protrusions, a first cylindrical protrusion being placed at a lower portion of said outer side, and a second cylindrical protrusion being placed in a spaced relation at a point above said first cylindrical protrusion.

3. A restraint system in accordance with claim 2, wherein said support member contains at least two recessed cylindrical portions for mating with said cylindrical protrusions.

4. A restraint system in accordance with claim 3, wherein said support member is shorter in length than said vertical plate.

5. A restraint system in accordance with claim 4, wherein said vertical plate is of a predetermined length, and a plurality of said vertical plates are joined together to form said restraint system.

6. A restraint system in accordance with claim 5, wherein said support member is used to join together said vertical plates.

7. A restraint system for a segmented paved surface comprising,
    a vertical plate having an inner side for contacting an edge of said paved surface and an outer side,
    a support member which connects to the outer side of said vertical plate,
    a horizontal surface formed along a lower surface of said vertical plate for fitting under said segmented paved surface,
    said outer side including a protrusion extending outwardly from said outer side, said protrusion being substantially perpendicular to said vertical plate,
    said support member including a recessed portion, said recessed portion for mating with said protrusion to provide said connection between said vertical plate and said support member said protrusion being snapped into said recessed portion,
    an aperture extending vertically through said support member to receive a stake to connect said support member to an underlying surface, and
    said horizontal surface, including a plurality of openings to facilitate bending of said restraint system.

8. A restraint system in accordance with claim 7, wherein said protrusion is substantially cylindrical.

9. A restraint system in accordance with claim 8, wherein said recessed portion is substantially cylindrical.

* * * * *